Nov. 4, 1947.  T. F. STACY ET AL  2,430,033
METHOD OF MOLDING RESINS
Filed Nov. 12, 1941  2 Sheets-Sheet 1
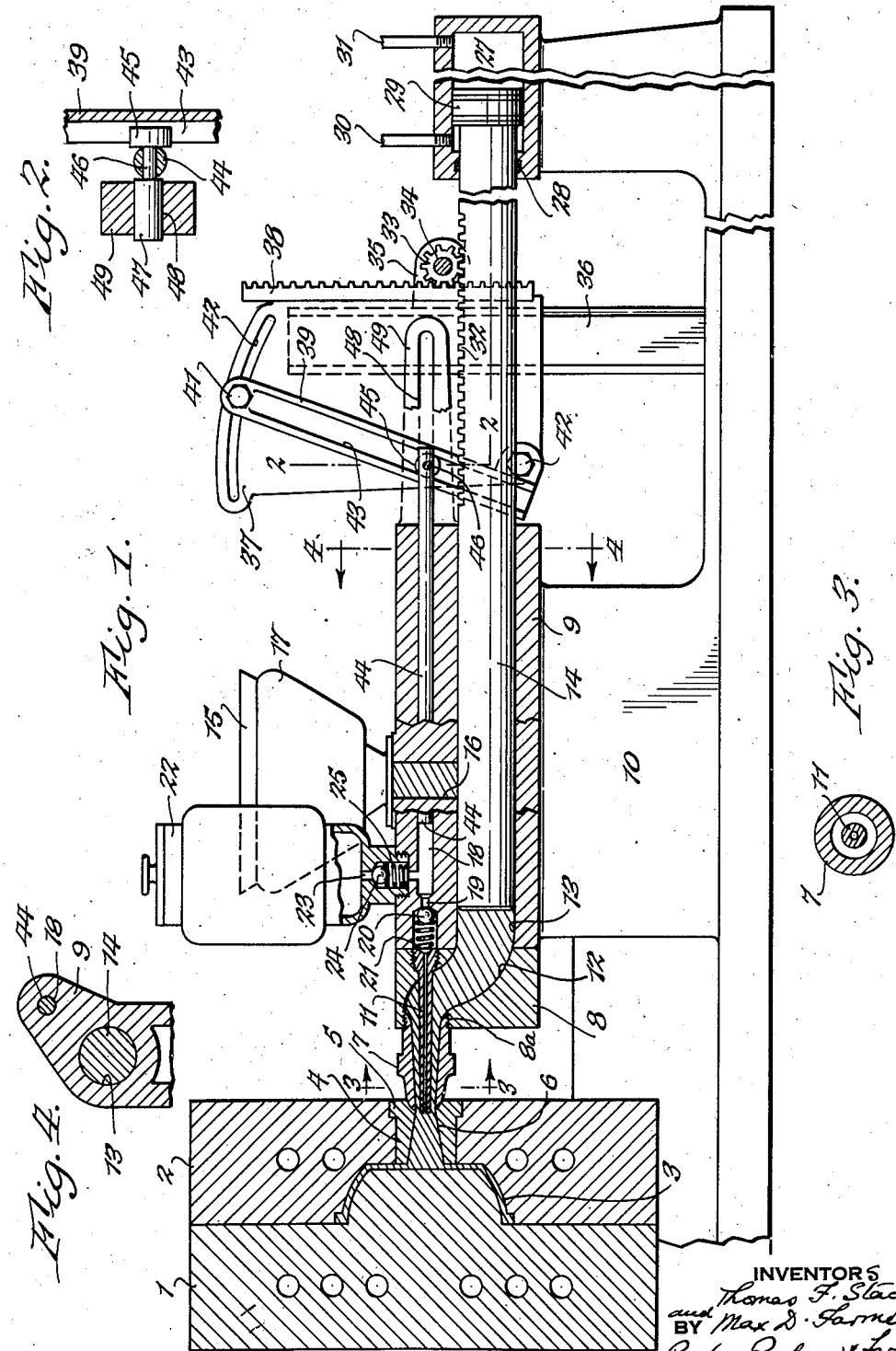
INVENTORS
Thomas F. Stacy
and Max D. Farmer
BY Parker, Rockwood & Farmer.
ATTORNEYS

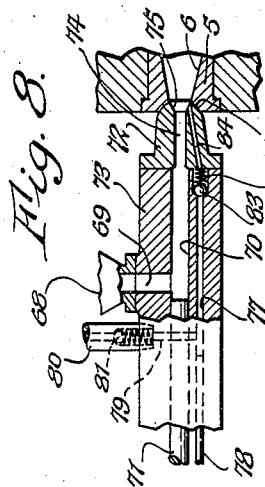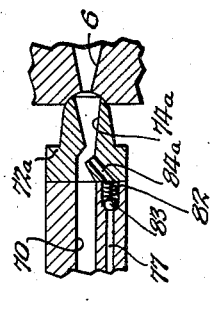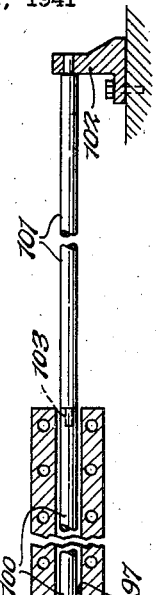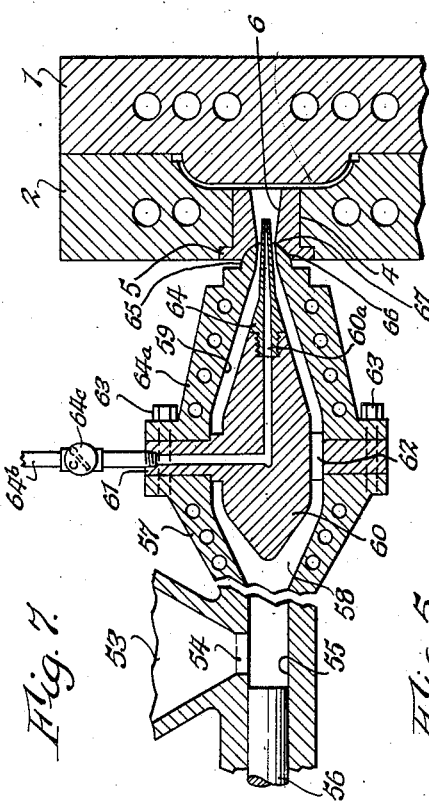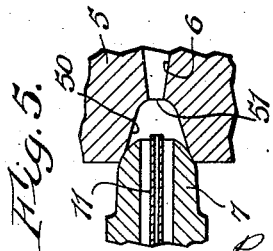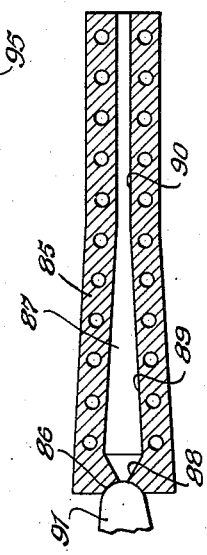

Patented Nov. 4, 1947

2,430,033

UNITED STATES PATENT OFFICE 2,430,033

METHOD OF MOLDING RESINS

Thomas F. Stacy, Piqua, Ohio, and Max D. Farmer, East Aurora, N. Y., assignors to The French Oil Mill Machinery Company, Piqua, Ohio Application November 12, 1941, Serial No. 418,640

13 Claims. (Cl. 18—55)

This invention relates to the molding of resinous materials, and more particularly to what is known as injection molding of resin plastics and resinous materials of the thermal setting type, and of the type which harden upon the introduction of a hardening agent. The thermal setting type resins may be liquids or solids at ordinary temperatures and they are rendered infusible or hardened by the application of heat, but this hardening or advance to the infusible stage may be very greatly accelerated by the use of a suitable catalyst or hardening agent. Some thermal setting resins as used heretofore for molding have first been advanced to a solid stage when at ordinary room temperatures and then reduced to a dry powder, the powder being then mixed with suitable fillers and an accelerator in powder form. Such powder mixtures do not advance to the infusible stage at ordinary room temperatures and atmospheric pressure, but when subjected to heat and pressure, they advance quite rapidly into the infusible, solid stage. Accordingly, it has been proposed, as shown by U. S. patents to Shaw 1,916,495 and 1,919,534 to subject a measured quantity of such a mixture to heat and high pressure sufficient to liquefy the mixture and force it into the mold progressively as rapidly as it liquefies, the heat and pressure being applied in close proximity to the mold. Such a method has not been entirely satisfactory for various reasons, one of which is the difficulty of heating all of the mixture uniformly and rapidly enough, and also the inability to handle large batches of the resin in that manner within a short interval of time.

One object of the invention is to provide an improved method of injection molding of thermal setting resins which will enable the molding of relatively large articles of such resins easily and quickly, which may be performed with relatively simple apparatus, which will result in increased production and which will be relatively simple and inexpensive.

Another object of the invention is to provide an improved method of injection molding by which molded resinous articles of the type which harden rapidly when a hardening agent is added, may be easily, rapidly and inexpensively produced in quantity.

Other objects and advantages will appear from the following description of some examples of the practice of the invention, and the novel features will be particularly pointed out hereinafter in the appended claims.

In the accompanying drawing:

Fig. 1 is a longitudinal sectional elevation through a machine for injection molding of thermal setting resins which may be employed in the practice of this improved process;

Fig. 2 is a transverse sectional elevation of the same, the section being taken approximately along the line 2—2 of Fig. 1;

Fig. 3 is a transverse sectional elevation through the nozzle of the same, the section being taken approximately along the line 3—3 of Fig. 1;

Fig. 4 is another transverse sectional elevation through the device, the section being taken approximately along the line 4—4 of Fig. 1;

Figs. 5 and 6 are longitudinal sectional views through nozzles and molds also made in accordance with this invention but illustrating modifications;

Fig. 7 is a longitudinal elevation of a modified embodiment of the invention;

Figs. 8 and 9 are elevations, partly in sections, of part of the apparatus of Figs. 1 to 4, but showing modifications thereof;

Fig. 10 is a sectional elevation of apparatus for molding solid rods of resinous materials in accordance with this invention; and Fig. 11 is a similar sectional elevation for molding tubes from resinous materials in accordance with this invention.

In accordance with one embodiment of this invention, a suitable thermal setting resin is supplied for the molding process in liquid or fluid condition, and either the resin, during its manufacture, is stopped in an intermediate stage in which it is fluent at the desired injection or working temperature and pressure (sometimes called the "A" stage) or it is further advanced toward but not entirely to the solid and infusible stage, to a stage sometimes called the "B" stage, then subsequently reduced to liquid or fluent condition in any suitable manner, but preferably by heating it to a temperature at which it becomes sufficiently fluent to be molded. Such resins, when normally fluent or when heated at least to a temperature at which they are fluent, then may be advanced very rapidly to the infusible or rigid stage sometimes called the "C" stage, if an accelerator, hardening agent or catalyst is included in or added to the resin. Whenever herein, reference is made to a catalyst or to a hardening agent, such statement is intended to include any added agent which when added to a resinous material, causes, accelerates or hastens, the hardening of the resinous material.

The rate of advance to the infusible stage will depend to some extent upon the amount of accelerator, hardening agent or catalyst added to the resin, but it is usually important that the hardening agent or catalyst be added to the fluid resin just prior to or during the molding operation, otherwise the resin may advance to the final stage while stored and in heated condition. Accordingly, the selected thermal setting resin is forced into the molds while in a fluent, and preferably heated, condition by injection molding that is by being forced in as a stream under pressure, to entirely fill the mold, and held in mold cavity under substantial sustained pressure. The catalyst or hardening agent preferably is added to the stream of fluid resin between the pressure applying device or means and the final position of the resin in said stream in the mold, and preferably simultaneously with, or only just prior to, the injection of the resin into the mold. While in some instances the hardening agent can be added to the resin before the injection pressure is applied, if the molding is done promptly after the hardening agent is added, it is usually preferable to delay the addition of the agent at least until the material starts its travel by injection pressure to the mold, because there is less danger of the material setting in and plugging the passages of the injection mechanism if there should be any material delay in movement of the resin to the mold, and because the temperature of the resin delivered may be made higher without danger of the resin hardening too soon. In other words, after the catalyst or hardening agent has been added to the fluid resin, the resin must be molded promptly, otherwise it may harden and lose its molding fluidity. The catalyst or agent therefore is preferably added to the stream of fluid resin as the latter moves toward the mold, or to the stream of resin as the stream is about to enter the mold, or to the resin in the mold before the resin reaches its final position in the mold.

It is understood that within the broader aspect of the invention, the catalyst or hardening agent can be injected directly into the mold through a separate opening, such injection in this manner being preferably prior to or simultaneous with the delivery of the resin into the mold. It is desirable to mix the catalyst or agent with the fluid resin to some extent, but inasmuch as the action is usually a catalytic one, reasonably satisfactory results can be obtained without such thorough mixing. By injecting the catalyst or agent with the resin into the mold or into the resin as it is about to enter the mold, the resin can be handled at a higher temperature and more accelerator can be used at each molding operation, which will decrease the time required for the resin in the heated mold to advance to the rigid or set condition.

Quite a number of thermal setting resins suitable for such injection molding are available in the open market, among which may be mentioned the phenolic-aldehyde, condensation group of resins. Examples of that group in common use are the phenol-formaldehyde resins and the phenol-furfural resins. Another group of suitable resins is known as the urea group, and examples of this group in common use are urea-formaldehyde resins and thiourea-formaldehyde resins. It will be understood, however, that these are merely typical examples and that various other thermal setting resins may be employed. Various catalysts or hardening agents which control the hardening of these resins or their advancement into the rigid or infusible stage are known and in common use. Probably the accelerator or catalyst most commonly used for this purpose with the phenol-aldehyde type of resin is hexamethylenetetramine, which may be obtained in powder form. This catalyst which is commonly used in amounts of not more than 5% is usually relatively inactive at temperatures below approximately 100° C. because at higher temperatures this catalyst breaks up into ammonia and formaldehyde, and ammonia is a catalyst for phenol-aldehyde resins. Some catalysts are also disclosed in U. S. Patent 2,078,831. Other catalysts for the phenol-formaldehyde type resins are alkalies such as ammonia and sodium hydroxide, and salts of hexamethylenetetramine.

The urea-formaldehyde type of resin usually requires acid catalyst, and examples of such acid catalysts in common use are hydrochloric acid and sulphuric acid. The urea resins are very sensitive to catalysts of an acid nature, and, therefore, it is preferable not to introduce the acid into the resin until the resin is about to be or is being injected into the mold. Hence, the catalysts heretofore most commonly used for these resins have been those which liberate an acid at molding temperatures. If a latent catalyst which is non-acid at the temperature at which the resin just remains liquid, is used, it may be mixed with such a resin at any time; and then, when the mixture is injected into the heated mold, the heat will convert the catalyst into an acid and cause a setting of the resin. According to this invention, the catalyst or acid may be advantageously added to the fluid resin just as the resin enters the mold, because then a preheated resin may be used and a rapid setting of the resin is possible.

The polyvinyl esters, such as may be formed by polymerization of vinyl chloride and vinyl acetate when heated to 100° C. in the presence of acid catalysts, such as lactic, hydrochloric and acetic acids, or the chlorides of zinc or aluminum, for example, yield a product which is elastic and more or less infusible and insoluble, and therefore may be grouped with the thermal-setting resins.

The sodium salts of highly ionized acids exert a strong accelerating action when the original urea-formaldehyde condensation product is produced with stabilizers that enable only a slow reaction. The hardening step of such resins may be accelerated by treating the uncured condensation products with any suitable agent or catalyst including weakly acid solutions of pH 4–7 such as disodium phosphate, or with formic acid, citric acid, acetic acid, hydrofluoric acid, hydrochloric acids, various solutions of mineral acids, and urea nitrate as well as a number of neutral catalysts.

In the example illustrated in Figs. 1 to 4 of one device that may be used for the practice of this invention, the mold sections 1 and 2 are releasably secured together in any suitable manner, as common in molding resins, and between the abutting faces of the mold sections is the mold cavity 3. This mold cavity opens outwardly through a passage 4 which is normally closed by a sprue plug 5 which has an enlarged head that is countersunk to its proper position in the mold section 2. The sprue plug 5 is provided with a sprue passage 6 which leads to the mold cavity 3, and the outer end of this passage is slightly rounded to receive the rounded nose of an injection nozzle 7. The nozzle 7 is removably secured or screwed in an opening 8a in a tubular member 8 which is removably secured to a cylinder frame 9 that is supported on a main base 10. A hollow needle or tubular pin 11 is removably secured in the member 8 from the face abutting the cylinder frame 9 and extends through the opening 8a in which the nozzle 7 is secured and along the interior of the passage of nozzle 7 in spaced relation to the walls thereof. It terminates adjacent or at the discharge end of nozzle 7, which engages in the concave seat on the outer face of the sprue plug 5 at the entrance to the sprue passage 6.

The member 8 is provided with a passage 12 which leads from the nozzle passage 8a laterally and then into communication with a piston chamber 13 provided in the cylinder frame 9. A piston or ram 14 is mounted for reciprocation endwise in the chamber 13, and when moved endwise to the left in Fig. 1, the piston 14 will discharge the contents of the chamber 13 through the passage of the nozzle 7. A hopper 15 for holding a supply of thermal setting resin in liquid or fluid form is secured to the cylinder frame 9, and a passage 16 leads from the hopper 15 to the chamber 13, adjacent the limit of rearward movement of the piston 14 but uncovered thereby before the piston reaches its rearward limit of movement. The contents of the hopper 15 may be kept hot or in fluid form by heat derived from the wall of the hopper, because of heat supplied thereto from a heating jacket 17.

The cylinder frame 9 is also provided with a smaller chamber 18 parallel to the chamber 13, and a restricted passage 19 leads from one end of the chamber 18 to the bore of the passage in the needle or tubular spindle 11. A ball 20 is urged into closed position against a seat in the passage 19 by a helical spring 21 which is compressed between the base of the pin or needle 11 and the ball, and the spring thus urges the ball 20 into closed position to prevent flow of liquid into the chamber 18 through the passage 19, but opens automatically to pass liquid under pressure from the chamber 18 to the passage of the pin or needle 11.

Another hopper 22 is also mounted on the cylinder frame 9, and a passage 23 connects the bottom of the hopper 22 with the chamber 18 adjacent the opening into the passage 19. A ball 24, is urged against a shoulder in the passage 23 by a spring 25, so as to form a ball valve which is normally spring-pressed into closed position where it opposes movement of a liquid from chamber 18 through passage 23 into hopper 22, but opens upon suction in the chamber 18 to pass fluid from the hopper 22 into the chamber 18. The hopper 22 may also be heated by means of a heating jacket 26.

Also supported upon the base 10 is a ram chamber 27, and the piston or ram 14 at its rear end extends into the ram chamber 27 through a packing gland 28, and within the chamber 27 terminates in an enlarged head forming a piston 29. Pipes 30 and 31 lead to opposite ends of the ram chamber 27 so that when any operating fluid under pressure is admitted to either end of the chamber 27 it will force the piston 14 in one direction or the other depending upon the end of the chamber 27 to which the operating fluid is admitted. Thus, by applying operating fluid to the chamber 27 alternately at opposite ends thereof the piston 14 may be reciprocated back and forth. The piston 14 carries rack teeth 32 which mesh with and drive a pinion 33 fixed on a shaft 34 which is suitably mounted for rotation in a pair of bearings 35 (only one shown) which project from an upright post 36 on the base 10.

A plate 37 is mounted to slide vertically on the post 36 in any suitable manner, and a rack bar 38 is disposed in vertical position along and secured to one edge of the plate 37, and meshing with the teeth of pinion 33, it being understood that the pinion 33 is long enough to mesh with the rack teeth 32 on piston 14 and also with the teeth of the vertical rack bar 38 disposed crosswise of and just at one side of the piston 14. As the piston 14 is forced to the left in Fig. 1 it will cause an elevation of the rack bar 38, and through it an elevation of the plate 37. Upon movement of the piston 14 to the right in Fig. 1 the pinion 33 will move the rack bar 38 downwardly and lower the plate 37.

An arm 39 is hinged at 40 to the lower end of the plate 37 and its other end carries a clamping bolt 41 which passes through an arcuate slot 42 in the upper end of the plate 37. The slot 42 has its center of curvature at the pin 40 and by tightening or loosening the bolt 41, the free end of the arm 39 may be clamped in any of a plurality of angular positions into which it may be rocked on its pin 40. The arm 39 has a slot 43 running lengthwise thereof. A small piston 44 reciprocates in the small chamber 18 and extends outwardly therefrom and carries a roller 45 (Fig. 2) which rolls in the groove 43. The roller 45 is fixed on one end of a pin 46 which extends transversely through and is rotatably supported by the small piston 44. The other end of pin 46 carries a roller or sliding block 47 which is received in and runs along a slot 48 in an arm 49 forming a rearward, taillike extension of the cylinder frame 9.

With such a device, when the piston 14 moves to the left in Fig. 1, to force resin from the chamber 13 through the nozzle 7 into the mold, it also causes a proportional and simultaneous elevation of the plate 37, and since the slot 43 carried by the arm 39 extends somewhat diagonally of the direction of movement of the plate 37, the roller 45 will be cammed along the groove 43 and will impart a movement to piston 44 also to the left, so as to force the contents of chamber 18 past ball 20 and through the bore in the pin or needle 11. By changing the position of the arm 39 into different angular positions, permitted by movement of the bolt 41 along the slot 42, one may vary the extent of movement of the small piston 44 for any given movement endwise of the larger piston 14. The nearer that arm 39 is to a vertical position, the less will be the movement of the small piston 14. The greater the angular deviation of the arm 39 from the vertical, the greater will be the extent of movement of the small piston 44 for any given movement of the piston 14, but the movement of the piston 44 will always be proportional to the movement of the piston 14 and simultaneous therewith in both directions.

The hardening agent or catalyst, if not in fluid form, may be in powder form or used in suitable solution in the hopper 22. For example, hexamethylenetetramine is normally a powder, but it is readily soluble in alcohol which is also a solvent for phenol-aldehyde type resins, so that an alcohol solution of such an agent may be injected through the bore of needle 11. It will, of course, be understood that the proportions of the piston chamber 13 and 18, as well as the angular position of arm 39, may be varied. since the drawings are not drawn to scale.

Referring now to Fig. 5, the nozzle 7 is shown as of the same construction as in Figs. 1 and 3, and it is received snugly in and closes the entrance end of a concave recess or chamber 50 in the mold member. The recess 50 communicates with the sprue hole 6. The fluid resinous material and the hardening agent are discharged from their respective apertures in the nozzle 7 into the recess 50 which serves as a mixing chamber, and the two materials after mixing to some extent in the recess 50 pass through a restricted neck 51, where further mixing occurs, into the smaller end of the sprue hole 6. After a molding operation, the nozzle 7 will be withdrawn from the recess 50 and the sprue broken off at the neck 51, whereupon one may remove any of the resinous material which may have hardened in the recess 50 sufficiently to interfere with its free flow into the mold cavity by the time the next molding operation is to be performed. In the case of a thermal setting resin, the mold is, of course, heated, but the portion of the mold around the recess 50 is not heated to as great an extent as that around the mold cavity proper, so that there is less hardening of the material in the chamber 50 than in the mold cavity proper.

In the embodiment of the invention shown in Fig. 6, the nozzle 7a is similar to nozzle 7 of Figs. 1 to 5, except that the tube 11 which conveys the hardening agent terminates within the passage for the resin, a short distance before the end of the nozzle is reached, and the passage in the free end of the nozzle 7a beyond the end of the tube 11 is flared slightly or made divergent toward the free end, as at 52. The end of the nozzle is received in a recess 50a in the mold member 5, and the recess 50a opens into the sprue hole 6 through a neck 51a. The operation with this embodiment is quite similar to that in Fig. 5, except that a small amount of the mixing of the resinous material and hardening agent occurs within the very tip end of the nozzle 7a where the passage flares as at 52, and then further mixing occurs as the resin and agent pass through the restricted neck or opening 51a into the sprue passage 6 leading to the mold cavity proper.

In the embodiment of the invention shown in Fig. 7, the resinous material while still in the fusible stage and in finely divided form, is deposited in the hopper 53 where it feeds by gravity through a neck or opening 54 into an injection cylinder 55. An injection ram or plunger 56 reciprocates in the chamber 55 from the position shown in full lines in Fig. 7, to the right in that figure, beyond the passage 54 so as to force a charge of the finely divided resinous material which fills the cylinder 55 in advance of the piston 56, toward the right and into the small end of a liquefying device 57. Any suitable type of liquefying device may be employed, but that shown comprises a heated form transversely split into two sections, with first a diverging passage 58, and then a converging passage 59. Disposed within the chamber of this heating device 57 is a core 60 which has tapered ends extending therefrom in opposite directions so as to divide the material moving along the diverging passage 58 into hollow or tubular form, and to form with the converging end of the passage a tubular converging passage which holds the stream of material in hollow form, that is as a converging annulus.

The member 60 has a peripheral flange 61 at its largest part which is clamped between the sections of the form 57. This definitely locates the core 60 with respect to the walls of the chambers or passages 58 and 59. To pass the material from the passage 58 to the passage 59, this flange 61 is provided with a plurality of cylindrical passages 62 extending from face to face and arranged in an annular row about the core 60 so as to connect the large ends of the passages 58 and 59. The flange 61, outwardly beyond the large ends of the passages 58 and 59 is reduced in thickness where it is received and clamped between the two sections of the form 57, the sections being coupled to opposite sides of the flange 61 in any suitable manner, such as by screws 63. By removing the screws 63, the heating form may be taken apart to facilitate cleaning of the passages thereof in case the resinous material should, through some inadvertence, harden therein.

The right-hand end of the tapered end of the core 60 which extends into the passage 50 is made in two sections, the tip end section 64 having a reduced end portion 60a threaded into a recess in the abutting face portion of the core. This end 64 is tapered on its exterior convergingly toward its free end, but with a much smaller taper than the end coupled to the main body of the core 60, and extends beyond the convex end 65 of the form 57 which serves as the nozzle. This convex end 65 is received in a convex recess or cavity 66 formed in the mold member 5. This tapered end of member 64 corresponds in function to the tube 11 in Fig. 1, but it preferably extends into the sprue passage 6, so as to deliver the hardening agent further along the sprue passage toward the mold cavity proper.

The member 60 is provided with a passage 64a which leads through the peripheral flange to the exterior of the form 57. A pipe 64b is connected to passage 64a to supply thereto the hardening agent, and also contains therein a free check valve 64c that prevents reverse flow. The hardening agent is forced at any desired rate through pipe 64b but proportionally to the flow of resin. The resinous material passing through the heating form 57 is heated sufficiently to reduce it to fluid form with a viscosity that enables it to be molded, and preferably to a temperature closely approaching or substantially that at which it hardens rapidly when the hardening agent is added.

The hardening agent and resinous material intermix as they pass together into the sprue passage and into the mold proper, and, after an article is molded, the injection apparatus may be withdrawn from the cavity 66 because the material in the sprue will break off at the restricted neck 67. The tapered exterior of the free end of the member 64 will enable this member to be withdrawn from the hardened material of the sprue. This has the advantage of reducing the amount of waste resinous material in the sprue. The resinous material may be heated to a higher temperature, that is, more nearly toward the temperature of the mold, and then, after the hardening agent is added in the sprue passage and mixed with the resin as they both pass into the mold cavity proper, the resin is ready to harden, without the necessity of first substantially increasing the temperature of the resin before substantial hardening will begin.

One difficulty with rapid molding heretofore, has been that if the resinous material is heated too rapidly in the mold, blisters tend to form on the molded article, but by slowly heating the resinous material to reduce it to fluid condition in the form 57, and bringing it substantially to the molding temperature, that is the temperature of the walls of the mold, before it enters the mold cavity, this trouble from blisters will be eliminated. The hardening agent then causes a relatively rapid setting of the hot resinous material, thereby cutting down the molding time required. More hardening agent can be employed when added to the hot resin than was heretofore possible, which further reduces the time for the hardening.

In Fig. 8, a modification of the apparatus shown in Figs. 1 to 4 has been illustrated. In this embodiment of the invention, the resinous material in fluid form is supplied through a hopper 68 and passage 69 into an injection cylinder 70. This cylinder 70 corresponds to the injection cylinder 13 of Fig. 1, and an injection plunger or ram 71, reciprocating in the cylinder 70, corresponds to the ram piston 14 of Fig. 1. An injection nozzle 72 is removably coupled to the end of the casing 73 in which the cylinder 70 is formed, so as to form a removable continuation thereof, and this nozzle 72 is provided with a passage 74 which is aligned with and forms a direct continuation of the passage of the cylinder 70. Passage 74 is flared, as at 75, at its extreme end, and opens through a convex end that is received in a concave recess 76 in the mold member 5 carrying the sprue passage 6.

A second but smaller injection cylinder 77 is also provided in the casing 73 to extend parallel to the cylinder 70, and a small ram 78 reciprocates in the cylinder 77 in the same direction as the ram 71. The two rams 71 and 78 may be operated in the same manner as the rams 14 and 44 of Fig. 1. The hardening agent is supplied to the cylinder 70 in advance of the ram 78 through a passage 79 that communicates with the passage of a pipe 80 threaded into the casing 73. The pipe 80, at its end coupled to the body 73 is provided with a check valve 81 of the ball type, which opens to pass hardening agent toward the cylinder 77, but closes to prevent reverse flow. The pipe 80 leads to any suitable reservoir for the hardening agent.

The passage of the cylinder 77, at the end of the casing 73 to which the nozzle 72 is coupled, is enlarged as at 82, to provide a ball chamber, and a ball 83 seats against the smaller end of the passage and is urged against it by a spring 84 which reacts between the ball 83 and the abutting end face of the nozzle 72. The nozzle 72 is provided with a passage 84 leading from the chamber 82 to the flared end 75 of the passage 74.

In operation, the nozzle 72 is fitted against the mold as shown in Fig. 8, and the pistons or injection rams 71 and 78 advanced to the right so as to force proportional charges of resin and hardening agent into the sprue passage 6. The passage 74 forms a direct continuation of the injection cylinder 70 so as to offer a minimum resistance to flow of the resin into the sprue passage, and as the resinous material passes through the flared end 75 of the passage 74, it eddies to some extent and the stream it forms also expands along the sprue passage 6. The hardening agent is delivered gradually and proportionally through the passage 84 into the expanding stream of the resin as the latter eddies in the flared end 75, and this causes a mixing of the resin and hardening agent as they move together along the sprue passage 6 into the mold cavity proper.

With such an arrangement, there will be a minimum of danger of the resin hardening in the injection cylinder, in case there should be a slight delay between molding operations. Any hardening that occurs outside of the mold cavity proper, will occur in the sprue passage 6 and in the flared end 75, where the hardened material is easily removed because of the tapered nature of the passages. Since the resin must be injected under pressure and held under pressure, there is no danger of the resin backing up and clogging the relatively smaller passage 84 because the ball 83 would seat automatically and prevent such back flow, and if for any reason, the end of passage 84 should be plugged, it can be easily opened after first removing the nozzle 72, thereby placing the passage 84 in a position to be reached from either end. The passage 84 is a straight passage, and hence it may be redrilled when necessary to remove any hardened resinous material.

In Fig. 9, still another modification is illustrated, which is the same as in Fig. 8, except that the passage 74a in the nozzle 72a is made somewhat zigzag in shape so that as the resinous material moves through this zigzag passage, it will be caused to eddy to some extent before it reaches the discharge end. The passage 84a delivers the hardening agent into the passage 74a at a point immediately behind a shoulder in the zigzag passage where eddying of the resinous material occurs, and this causes some mixing of the resinous material and agent, which mixing continues gradually expanding or outwardly diverging section of the passage 74a before the mixture enters the sprue passage 6.

Fig. 10 illustrates a modification of the invention for the formation of solid rods of resinous material by a more or less continuous process. In accordance therewith a heated form or mold 85 is provided at one end with a concave entrance recess 86, and a passage 87 extends from that concave recess to the opposite end of the form. This passage 87, at its junction with the recess 86, is first flared or made divergent in the direction of flow from the recess 86, as at zone 88, and then it is made slowly convergent as at zone 89, and then the last zone 90 of the passage is made of substantially uniform diameter. The mixture of resin and hardening agent is delivered by successive, small increments or by continuous movement through the nozzle 91 of any suitable construction, and this mixture first expands in the zone 88 of the passage, then is gradually compacted in the converging zone 89, and then is carried along the zone 90 of uniform diameter for a considerable distance.

As the stream of resinous material and hardening material first expands in the zone 88 and then is compacted in the zone 89, the hardening agent is more thoroughly mixed with the resinous material, and the hardening action initiated, so that by the time the mixture reaches the zone 90, it is still fluid or plastic but is approximately at the hardening stage. As this mixture then passes along the zone 90, the hardening proceeds rapidly and a continuous rigid rod of the resinous material is discharged from the free end of the mold or form 85. The zone 90 is, of course, sufficiently long so that the mixture of resinous material and hardening agent may harden into a rigid mass in the time required to travel zone 90 and before it is discharged.

In the embodiment of the invention shown in Fig. 11, one manner of converting the resinous material into a tubular rod or pipe is illustrated. A heated mold 92 is formed of two sections A and B, which are coupled together by screws 93. The end formed by the section A is provided with a concave recess 94 which is similar to the cavity or recess 86 of Fig. 10.

The passage through the form or mold 92 has a flared or divergent zone 95 corresponding to the zone 88 in Fig. 10, and provided entirely in the section A. The passage of the mold is also provided with a slowly converging zone 96 which corresponds to the zone 89 of Fig. 10. The mold passage also has a final zone 97 of approximately uniform cross section, which corresponds to the zone 90 of Fig. 10. Clamped between the sections A and B is a baffle plate 98, which extends across the passage of the mold between the large end of the diverging zone 95 and the large end of the converging zone 96. This plate 98 is provided with a plurality of apertures 99 from face to face and arranged in a row around the marginal area of the large end of the zone 95. A core or rod 100 is disposed along the passage of the mold, with a reduced end threaded into a central opening in the baffle 98 so that the rod 100 will be disposed approximately centrally of the passage through the mold. The reduced end which projects through the plate 98 may terminate as a cone so as to facilitate spreading of the resinous material towards the apertures 99.

As the resinous material with the hardening agent therein moves along the zone 95, the resin and hardening agent may mix to some extent and will be further mixed in passing through the row of small passages 99 in the baffle plate 98. The mixture then in passing along the converging zone 96 will be compacted around the rod or core 100, and this core will thus form a passage through the resinous mass as the latter continues along the zone 97 where it is hardened into a rigid mass. Where the process is to be continuous, the free end of the core or rod 100 may be left unsupported after the rigid mass begins to leave the mold and the resinous material will tend to keep the rod substantially central, but in instances where it is desired to have the core 100 spaced quite accurately from the walls of the passage, a rod like support 101 may be rigidly but removably supported at one end in a base 102 with its other end provided with a reduced section 103, and telescoped into a cavity in the free end of the rod 100.

The hardened tubular resinous object may slide along the support 101, which is preferably slightly smaller than the rod 100 so as to offer a minimum of resistance, and the rod 101 serves to support and properly position the free end of the rod 100. The rod 101 may be made of any desired length, but usually after a length of tube or pipe has been formed from this resinous material and received on the rod 101, the rod 101 and the base 102 may be removed, because the hardened material leaving the mold will automatically space the rod 100 at its free end and the process may be continued indefinitely, to provide tubes of the desired length. The resinous material and hardening agent may be delivered into the diverging zone 95 of the mold through a nozzle 91, which may be the same as that for Fig. 10.

The operation of the embodiments of the invention shown in Figs. 5 to 11 will be obvious from the foregoing description and will not be repeated. It will be understood that plasticizers and lubricants may be incorporated in the resinous material, the lubricants to reduce any tendency of the resinous material to adhere to the mold, and the plasticizer to serve its usual purpose. In starting an operation of the apparatus of Figs. 10 and 11, one may, if desired, hold an object temporarily across the discharge end of the heated mold in order to create a back pressure on the resinous material until the material is compacted to the desired density, and then when the obstruction is removed, the resistance to movement of the material along the passage of the mold will be sufficient to maintain the back pressure which is necessary to produce the desired density in the resinous material.

It will also be understood that the various molds and nozzles may all be split endwise, if desired, and the sections coupled together. This makes it possible to open the apparatus to remove any resin that has been hardened therein in case an unexpected shutting down of the apparatus should become necessary, or at the end of the day.

Another resinous material that may be employed as the molding resin is one made from a polybasic acid—polyhydric alcohol and a fatty acid, such as disclosed for example in United States patent to Kienle No. 1,893,873. These resins are also sometimes called "glyptal" resins and "alkyd" resins. They also may be mixed with phenolic-aldehyde condensation resins and other resins. Examples of suitable hardening catalysts for these "glyptal" resins are barium peroxide and aluminum chloride.

It will be understood that by the term "injection molding," we refer to the forcing of a molding material while in fluid condition under a substantial pressure differential into the mold cavity to entirely fill that cavity.

It will be understood that various changes in the details, materials, order of steps, and arrangements of parts which have been herein described and illustrated in order to explain the nature of the invention, may be made by those skilled in the art within the principle and scope of the invention as expressed by the appended claims.

This application is a continuation in part of our copending allowed application Serial No. 362,382, filed October 23, 1940, for Molding of resins.

We claim:

1. The improved method of injection molding thermal setting plastic material which comprises heating said material until it is substantially fluid, injecting said heated fluid material under pressure into a closed mold until it completely fills the cavity of said mold, mixing a non-gaseous hardening acceleration material with said heated, fluid material during said injection and before it reaches its final position in the cavity of said mold, and holding said mixture of materials in said mold until it has become substantially rigid.

2. The improved method of injection molding of thermosetting resin plastics which comprises forcing a stream of said resin while in fluid condition under pressure, and incorporating in said stream, by injection molding into a heated mold until said resin entirely fills the cavity of said mold a minor amount of a non-gaseous hardening acceleration material during its movement into the mold, and maintaining heat on said mold until the mixture of resin and agent becomes rigid.

3. The improved method of injection molding which comprises injecting, under a substantial pressure differential, a thermosetting resinous molding material while in a fluid condition and free of any hardening agent in a quantity sufficient to cause substantial hardening of the resinous material within the time normally required to mold an article from that material.

into a mold until the mold cavity thereof is entirely filled with said material, adding to the fluid resinous material so injected, after it starts its travel under said pressure differential and before said material reaches its final position in the mold, a non-gaseous resin hardening agent which materially accelerates the hardening of the resinous material, and holding said resinous material and hardening agent in the mold under a pressure above atmospheric until the resinous material hardens sufficiently to be self-shape retaining.

4. The improved method of injection molding which comprises injecting a thermal setting resinous material, while in a fluid condition and free of any resin hardening agent in a quantity sufficient to cause substantial hardening of said resinous material within the time normally required to mold an article from that material at that temperature of the material, under a substantial pressure differential into a mold until the mold cavity thereof is entirely filled with said resinous material, adding to the fluid resinous material, before such material reaches its final position in the mold, a non-gaseous resin hardening agent which materially accelerates the hardening of the resin of that material, and holding the resinous material and hardening agent in the mold under a pressure above atmospheric, until the resinous material hardens into a rigid mass.

5. The improved method of injection molding of resin plastics which comprises injecting a thermosetting resinous material, in fluid condition and of the type which has a normally slow rate of hardening but may be hardened rapidly to a rigid mass upon the addition thereto of a hardening agent, as a stream into a mold until it entirely fills the cavity of said mold, and adding to the liquid resinous material of said stream, during the injection and before said material reaches its final position in said mold, and before it loses its fluidity, a non-gaseous, hardening agent which will cause a rapid hardening of said material, and confining said material with added hardening agent in said mold until rigid.

6. The improved method of injection molding of resin plastics into elongated rigid bodies which comprises forcing a stream of fluid thermosetting resinous molding material slowly through a peripherally enclosed, long tunnel in which the material may progressively harden to a rigid mass having, in cross section, the shape and approximate size of the zone of the tunnel in which it becomes rigid, and adding to said fluid material of said stream, before said material reaches a selected zone of said tunnel, a material which causes a rapid hardening of said material in said tunnel while said material continues its movement along said tunnel and through said zones.

7. The improved method of injection molding resin plastics into elongated rigid bodies which comprises forcing a thermosetting resinous molding material in fluid condition as a stream through an elongated, peripherally confining chamber, forming said stream in said chamber into a hollow tube as the stream moves through said chamber and holding it in tube form, and subjecting said material of said stream before said material has progressed far through said chamber, to the action of a material which causes a rapid hardening of said material in hollow form into a rigid mass as said material moves through the final zone of said chamber.

8. The improved method of injection molding of resin plastics which comprises forcing a stream of thermosetting resinous material while in fluid condition and free of sufficient hardening agent to cause loss of molding fluidity of said material within the time normally required to mold an article from that material at that temperature of the resinous material, and under substantial pressure differential into a mold, until the cavity of said mold is entirely filled, and adding a non-gaseous hardening agent to said resinous material, while said material is still fluid, at a point in the flow of said material between approximately the application of injection pressure to said material and the final position of said material in said mold cavity, and maintaining said material in said cavity under substantal pressure differential until said injected material has hardened.

9. The improved method of injection molding of resinous materials which comprises injecting a thermal setting resinous composition having a relatively slow setting rate, in fluid condition, and under a substantial pressure differential, into a mold until the mold cavity thereof is entirely filled with said composition, adding to the fluid composition so injected, before said composition reaches its final position in the mold, a non-gaseous agent which causes a material acceleration of the hardening of said composition in said mold, supplying sufficient heat to the mold to cause said hardening, and holding the injected composition in the mold under a pressure above atmospheric until the material hardens into a rigid mass.

10. The improved method of injection molding of a thermosetting resinous material which comprises storing a quantity of said material in fluid condition, withdrawing said stored material in increments, injecting said withdrawn increments under a substantial pressure differential into the mold cavity of a closed mold until said cavity is entirely filled with said material, adding to said withdrawn increments before such increments reach final position in the mold, a non-gaseous agent which causes a material acceleration of the hardening of said material, but insufficient in amount to cause such hardening before said injected materials reach final position in the mold cavity, and holding said material in said mold cavity under sufficient pressure to keep the cavity entirely filled until the contents of the cavity harden to a self, shape-retaining body.

11. The improved method of injection molding of a thermosetting resinous material which comprises storing a quantity of said material in fluid condition, withdrawing said stored material in increments, injecting said withdrawn increments under a substantial pressure differential into the mold cavity of a closed mold, until said cavity is entirely filled with said material, adding to said withdrawn increments before such increments reach final position in the mold, a non-gaseous agent which causes a material acceleration of the hardening of said material, but insufficient in amount to cause such hardening before said injected materials reach final position in the mold cavity, supplying to said mold sufficient heat to accelerate the hardening of the contents of said cavity, and holding said material in said mold cavity under sufficient pressure to keep the cavity entirely filled until the contents of the cavity harden to a self, shape-retaining body.

12. The improved method of injection molding of thermal setting, plastic material which comprises injecting a fluid, thermal setting, urea-formaldehyde resin, at approximately hardening mold temperatures, into a mold until the mold cavity is entirely filled with the mixture, and adding to the resin moving into the mold, during the injection, an acid hardening acceleration agent in a proportion which will produce a desired, rapid rate of hardening of the mixture at the temperature in the mold, and keeping the mold filled until the mixture hardens.

13. The improved method of hot molding polyvinyl plastics which comprises heating such plastic material until it is fluid and approximately at mold temperature, injecting the fluid plastic material into a mold cavity until the mold cavity is entirely filled thereby, adding to the plastic material delivered to the mold, during the movement toward the mold, a minor amount of a non-gaseous, acid hardening material in a quantity sufficient to cause rapid hardening of the plastic material after it enters said cavity, and heat treating the plastic material in said mold until said material hardens.

THOMAS F. STACY.
MAX D. FARMER.

REFERENCES CITED

The following references are of record in the file of this patent:

UNITED STATES PATENTS

| Number | Name | Date |
|---|---|---|
| 2,050,100 | Kopp | Aug. 4, 1936 |
| 2,274,279 | Shaw | Feb. 24, 1942 |
| 1,370,800 | Egerton | Mar. 8, 1921 |
| 2,199,144 | Tegarty | Apr. 30, 1940 |
| 1,927,375 | Schmidt | Sept. 19, 1933 |
| 2,077,542 | Wulff et al. | Apr. 20, 1937 |
| 2,285,370 | Staelin | June 2, 1942 |
| 2,156,396 | Macklin | May 2, 1939 |
| 2,162,563 | Oldham | June 13, 1939 |
| 1,978,163 | Megow | Oct. 23, 1934 |
| 1,983,949 | Semon | Dec. 11, 1934 |
| 1,020,593 | Aylsworth | Mar. 19, 1912 |
| 1,401,953 | Baekeland | Jan. 3, 1922 |
| 1,508,124 | Richardson | Sept. 9, 1924 |
| 1,482,357 | Ellis | Jan. 29, 1924 |
| 1,115,766 | Aylsworth | Nov. 3, 1914 |
| 1,993,942 | Novothy | Mar. 12, 1935 |
| 2,296,295 | Shaw | Sept. 22, 1942 |